INVENTOR
J. Y. HOUGHTON
E. L. KILPATRICK
ATTORNEY

Patented Mar. 5, 1946

2,395,871

UNITED STATES PATENT OFFICE 2,395,871

SYSTEM FOR DETERMINING 3-DIMENSIONAL ANGLE OF APPROACH OR INCIDENCE OF RADIO WAVES

Joseph Y. Houghton, Chevy Chase, Md., and Edward L. Kilpatrick, United States Navy Application February 1, 1944, Serial No. 520,692

12 Claims. (Cl. 250—11)

(Granted under the act of March 3, 1883, as amended April 30, 1928; 370 O. G. 757)

This invention relates in general to radio direction finding systems and in particular to an improved system employing in a new manner an antenna of the type disclosed in application Serial No. 460,426, filed October 3, 1942, by Edward L. Kilpatrick, one of the present inventors.

In the prior system referred to, two identical loop-antennae were employed in symmetrical coplanar relation on opposite sides of a common planar axis, the said planar axis was oriented in azimuth by extraneous means, such as a homing antenna, to align it azimuthally with the apparent direction of incidence of a radio wave, the loops were then turned about the common planar axis to a position in which the instantaneous voltage difference between the voltages generated in the two loops produced a satisfactory signal level for detection purposes, and the coplanar axis was then tilted in the predetermined azimuthal plane until the signal was reduced to a minimum (i. e. a null), at which tilt angle, the planar axis was considered to be aligned with the three-dimensional angle of incidence of the radio wave.

Due to possible inaccuracy in predetermining the azimuthal plane by extraneous means (effects of aberration, etc.) this arrangement was subject to possible error, since if the plane of azimuth was not accurately determined the null would be obtained at some position in which the unbalanced voltage due to differences in time phase with respect to the horizontal components of flux reaching the two antennae was balanced out by a residual unbalanced voltage due to difference in time phase with respect to the vertical component. Thus both factors of the 3-dimensional angle were dependent upon the accuracy of the extraneous means for predetermining the azimuthal plane.

The present improvement in method and arrangement aims to obviate the aforesaid difficulties, and to provide a system in which the indication of the 3-dimensional angle is rendered independent of any extraneous determination of azimuth, and an indication of the true angle of approach of the incident wave front assured.

Thus one specific object of this invention is to make one double loop type of antenna system serve for 3-directional determination of the angle of incidence of radio waves.

Another object of this invention is to eliminate use of the homing loop antenna employed in the Kilpatrick system for horizontal determinations, and thereby eliminate the aberration error resulting from such use.

Other objects and features will become apparent upon careful consideration of the following detailed description when taken together with the accompanying drawing, the figures of which are designed for the sole purpose of illustration and not as a definition of the limits of the invention, reference for the latter purpose being had to the appended claims.

Figure 1:
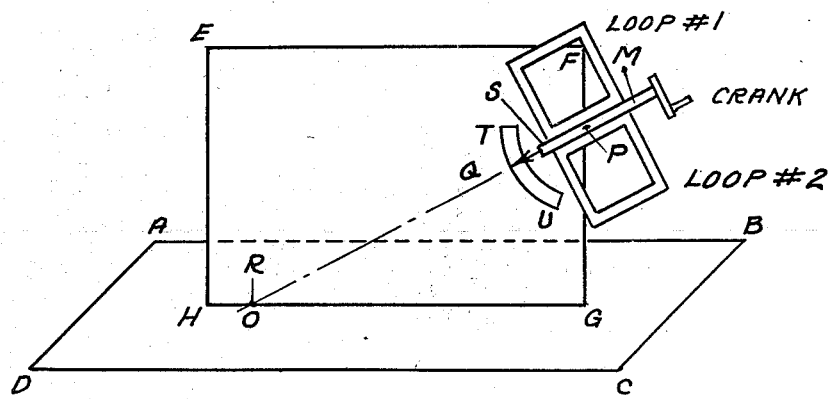
Fig. 1 illustrates the arrangement of the prior art.

As a prelude to discussion of the present improvement reference is made to Fig. 1 of the accompanying drawing illustrating the prior Kilpatrick system. In Fig. 1, the plane ABCD is the horizontal plane embracing the radio transmitter R, and the plane EFGH is the azimuthal vertical plane predetermined by extraneous means, and intended to embrace the transmitter R. The planar axis SM, of the system comprising the two identical loop antennae, #1 and #2, located in symmetrical coplanar relation on opposite sides of the axis SM, is pivoted about a transverse axis P to tilt in the predetermined plane EFGH as shown. The system was provided with means, as the crank on axis SM, for rotating the antennae, with the axis tilted in some direction other than direction PQ until a definite signal was obtained. The system was then tilted about axis P to a position in which the signal disappeared, in which position the axis SM was considered to be aligned with the direction of incidence of the wave front (i. e. the direction PQ), and the measure of the inclination of axis SM, in any suitable manner, exemplified by pointer T traversing vertical angle scale U, was taken as the vertical angle of incidence of the wave front.

Now, if the plane EFGH were accurately determined, then at only one alignment of axis SM, would the radial legs of the two loops be simultaneously cut by magnetic flux of the same time phase, and they would be so cut in all positions of rotation of the crank. But if the plane EFGH were not accurately determined, then different positions of the crank, coupled with different angles of inclination of SM in the inaccurate plane EFGH would produce nulls, and a double possibility of error thus exists.

Figure 2:
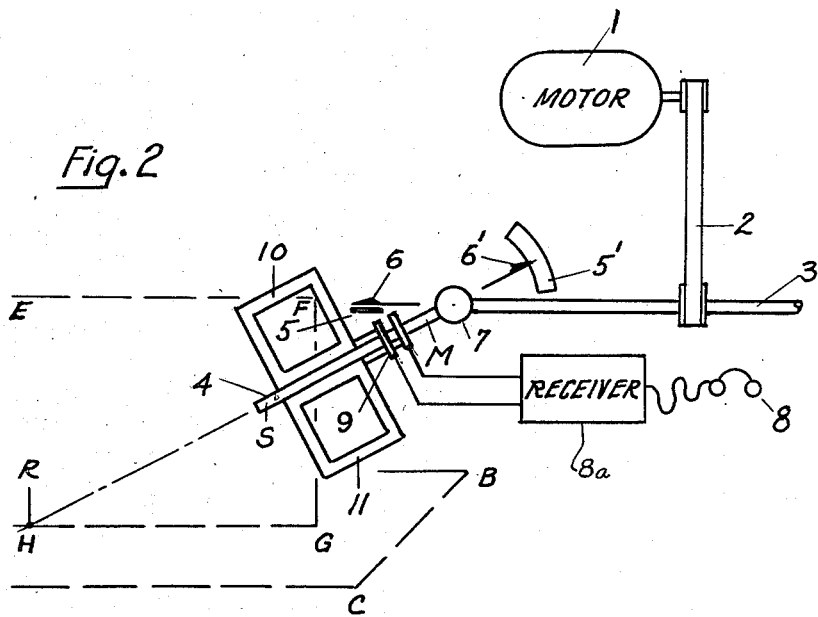
Fig. 2 illustrates one embodiment of the present invention.

Referring now to the embodiment of the present invention exemplified in Fig. 2, the system therein shown contemplates continuous rotation of the symmetrically located identical loops about the axis of symmetry S—M by any suitable means, as by making the axis SM itself the armature of a motor, or, in the form shown, by driving the axis SM from a separate motor 1 through a belt 2, shaft 3 and universal joint 7 (shown to make clear that while constant speed of rotation of the loops may be employed it is not essential). It will be understood that such rotation may be physical, or by electrical substitution of a number of pairs of fixed loops by commutators or the like. Under the rotary condition of operation, while a minimum (null) position of the loops may be passed though with an inaccurately located plane EFGH and an inaccurately located inclination of SM, this will be only a transient null in the rotation of the loops about the SM axis, and a pure minima (null) throughout the complete rotation of the system about the SM axis can be obtained only when that axis is normal to the wavefront of the incident wave.

The complete system, as exemplified in Fig. 2, employs any suitable means for translating the residual voltage difference between the voltages in the two loops into an intelligible form, this in the arrangement shown, being effected by coupling the leads from the two opposition connected loops 10 and 11, as through slip rings 9 carried by the shaft 4 rotatable about its longitudinal axis SM, to a radio receiver 8a of any suitable form having its output connected to a translating device exemplified by the telephone headset 8. Any suitable means may be employed for indicating the 3-dimensional angle of orientation of the axis SM when the pure null is obtained throughout continuous rotation of the loops thereabout, herein exemplified by scales 5 and 5' and pointers 6 and 6', the latter correlated to follow the horizontal trace in azimuth and the vertical inclination from horizontal, of the axis SM as it is brought into alignment with the angle of incidence of the radio wave.

In determining the 3-dimensional angle of incidence of the radio wave by the present invention, with the aid of the new continuously rotatable loop system of Fig. 2, a new method of procedure is employed. The loop system is set into rotation about the axis SM and the receiver adjusted to provide a suitable signal. Then with or without the aid of any predetermination of the approximate azimuthal angle of incidence of the wave, the axis SM is moved in three dimensions, i. e. swung in azimuth and vertically, thus probing in a cone of decreasing average difference of voltage phase in the two loops until the alignment of pure null reception is attained, at the single determinate angle in which the axis SM is normal to the incident wave front. The azimuthal angle may then be determined, by suitable means, as indicator 6 correlated with scale 5, which may be the scale of a compass card, and the vertical angle likewise, as by indicator 6' correlated with the scale 5' which may be the scale of an artificial horizon device to refer the vertical angle to the horizontal plane BC. In this manner the 3-dimensional angle of the incident wave front, and thus the apparent location of the wave-originating transmitting-antenna R, is easily and quickly obtained, in a completely determinate manner, and without introduction of error from inaccuracy of other equipment.

The invention contemplates the employment of gimbals or any other universal mounting in lieu of the shaft 3 and universal 7, slight misalignment of one of the loops with respect to symmetry to render the two identical electrically in the event of slight variations between them, the employment of any suitable offtake means in lieu of the slip rings 9, operation with each of the loops turned 90° about its planar axis parallel to the system axis SM (or less efficiently with each of the two loops turned to a lesser angle than 90° about one of its planar axes while maintaining mutual symmetry) and various other modifications in details of arrangement and procedure, as will be apparent to those skilled in the art from the present illustrative disclosure.

Figure 3:
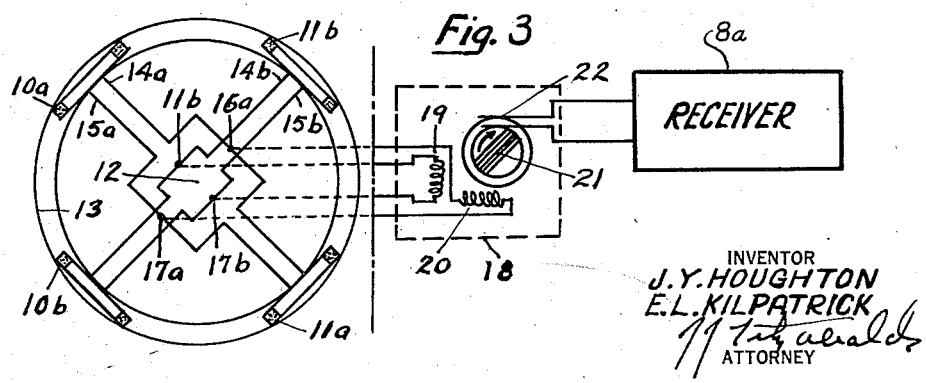
Fig. 3 illustrates, in side elevation, a modified form of system according to this invention, with the antenna portion turned 90° about a vertical axis for clarity.

One modification, for example, is shown in Fig. 3, in which electrical rotation of physically stationary loops is employed. As therein shown, the antenna system is made up of pairs of electrically identical loops $10^a$—$11^a$ and $10^b$—$11^b$ physically stationary with respect to the axis of symmetry 12 (normal to the plane of the paper) which may be a longitudinal axis in an aircraft fuselage represented by the shell 13, the aircraft or like body constituting a support for the antenna system adapted to orient it in 3-dimensions. As is the case in Fig. 2, the pairs of loops in Fig. 3 have their planes located in electrical symmetry on opposite sides of the axis 12, and preferably other than normal thereto. The pairs $10^a$—$11^a$ and $10^b$—$11^b$ are spaced from one another, depending on their number, by an angle of 180° divided by the number of pairs. In Fig. 3, there being two pairs, the angle between the pairs is 90°.

As before, suitable means is provided, for determining, as the orientation of the antenna system as a whole is changed, when a position is reached in which instantaneous voltages of equal magnitude and time phase are delivered by the opposite ones of all of the electrically identical loops, thereby to identify the orientation of the antenna system in which its axis of symmetry 12 is normal to the plane tangent to the wave front (i. e. the plane of the paper in Fig. 3, in which the loops are located) and hence aligned with the 3-dimensional angle of incidence of the wave. It will be perceived that if the antenna system as a whole is tilted relative to the plane tangent to the wave front, at least one of the pairs of loops will receive in its respective loops voltages out of time phase with each other. For some purposes six loops arranged in three pairs may be preferred; for simplicity four loops arranged in two pairs are shown in Fig. 3.

The fact that instantaneous voltages of equal magnitude and time phase are induced in the respective loops of each pair may be detected in numerous ways, the preferred mode being that shown in Fig. 3, in which the two loops $10^a$—$11^a$ (and $10^b$—$11^b$) of each pair are connected in voltage opposition by leads $14^a$—$15^a$ (and $14^b$—$15^b$) to output terminals $16^a$—$17^a$ (and $16^b$—$17^b$), symmetrically located so that when the desired condition is reached the minimum (null) vector sum of the voltages in the two loops is all that appears at the terminals.

As the present invention provides a method and means for bringing the plane of the antenna system (normal to axis 12) into alignment with the plane determined by the total magnetic flux vector and the vector resultant of the vertical and azimuthal components of the magnetic flux (as distinguished from its horizontal component transverse to its direction of propagation) the leads from terminals $16^a$, $16^b$, $17^a$, $17^b$, when extended normal to the plane of the antenna system, have no potential differences induced in them, and have only minimum potentials applied from the terminals. Hence shielding of these leads, while desirable, is not essential when they are so disposed.

With the loops of each pair connected in opposition as shown in Fig. 3, various commutating means may be employed to determine when the system is oriented so that the loops of each pair are producing nulls. In the preferred form shown in Fig. 3, the commutating means is suitably shielded, as at 18 and comprises a set of field coils 19, 20, corresponding in number and relative displacement to the number and displacement of the antenna pairs 10ª—11ª, 10ᵇ—11ᵇ, and a pick-up coil 21 rotatable in the field of the set of field coils so that the electrical equivalent of physical rotation of a pair of loops from position 10ª—11ª to 10ᵇ—11ᵇ, etc. is obtained. The output of coil 21, in this embodiment, is suitably coupled to the receiver as by slip rings and brushes 22, for example.

From the illustrative embodiment herein described, it will be apparent that further modifications and adaptations may be made, both in the method and the apparatus, without departing from the invention.

It is to be noted that where it is specified in the following claims that the two loops are electrically identical, and located in electrical symmetry, some variation from absolute identity and symmetry is contemplated, so long as such variation does not effect the results sufficiently to introduce material error in the angle-indication, and that similarly the identity of voltages in value and time-phase, and the purity of nulls, is subject to some variation from extraneous signals, and is subject to some tolerance, depending upon the accuracy of angle-determination desired. It is further contemplated that slight variations in identity of the loops may be in whole or in part compensated for by slight variations in the symmetry of their location, without departure from the invention.

Further, by use of follow-up mechanisms, or other suitable automatic controls, the departure from a null indication may be caused to give a signal, or to initiate an automatic probing device to automatically return the device to pure null position, or to train and direct other apparatus.

The invention described herein may be manufactured and used by or for the Government of the United States of America for governmental purposes without the payment of any royalties thereon or therefor.

What is claimed is:

1. The method of determining the plane tangent to a radiant energy wave front which consists in rotating about its axis of symmetry an antenna system comprising a pair of electrically identical loops having their planes located in electrical symmetry on opposite sides of said axis and other than normal thereto, and orienting said antenna system in 3-dimensions until identical instantaneous voltages of equal time phase are delivered by the two loops in all positions of rotation thereof, thereby positioning said axis of symmetry normal to the plane tangent to the wave front.

2. A method according to claim 1, in which the rotation of the antenna system is effected in a physical sense, and in which its orientation is also effected physically.

3. A method according to claim 1, in which the rotation of the antenna system is effected in an electrical sense, and its orientation is effected physically.

4. The method of determining the plane tangent to a radiant energy wave front which consists in rotating about its axis of symmetry an antenna system comprising a pair of electrically identical loops connected in voltage opposition and having their planes located in electrical symmetry on opposite sides of said axis, and orienting said rotating antenna system in three dimensions until the resultant voltage of the opposition connected antenna system is reduced to a minimum, thereby positioning said axis of symmetry normal to the plane tangent to the wave front.

5. The method of determining the plane tangent to a radiant energy wave front which consists in spinning about its axis of symmetry an antenna system comprising a pair of electrically identical loops connected in voltage opposition and located in electrical symmetry on opposite sides of said axis, and orienting said spinning antenna system in three dimensions until the resultant voltage of the opposition connected spinning antenna system is reduced to a minimum, thereby positioning said axis of symmetry normal to the plane tangent to the wave front.

6. A loop system, for determining the 3-dimensional angle of incidence of energy waves, having an axis of symmetry orientable in three dimensions, and comprising a pair of identical loop antennas mounted in symmetrical relation on opposite sides of said axis, means for rotating said loops about said axis, a receiver coupled to receive voltages from said two loops in mutually subtracting relation, means for probing with said antenna system by varying the 3-dimensional orientation of said axis of rotation until a position of orientation is reached in which a minimum signal is obtained in all positions of rotation of said loops, and means for determining the horizontal and vertical angles of the said axis, which in said position of orientation aligns with and indicates the angle of incidence of the energy wave.

7. An apparatus for determining the plane tangent to a radiant energy wave front, comprising an antenna system having an axis of symmetry and embodying a pair of electrically identical loops having their planes located in electrical symmetry on opposite sides of said axis and other than normal thereto, means for rotating said pair of loops about said axis, said antenna system being mounted on a support arranged to orient it as a whole in three dimensions, and means for determining, as said orientation is shifted, when an orientation is reached in which instantaneous voltages of equal magnitude and time phase are delivered by the respective loops of the pair in all positions of rotation thereof thereby to identify the orientation of said antenna system in which its axis of symmetry is normal to the plane tangent to the wave front.

8. An apparatus for determining the plane tangent to a radiant energy wave front, comprising an antenna system having an axis of symmetry and embodying pairs of electrically identical loops physically stationary with respect to said axis of symmetry and having their planes located in electrical symmetry on opposite sides of said axis and other than normal thereto, said pairs being displaced from one another about said axis by an angle of 180 degrees divided by the number of pairs; said antenna system being mounted on a support arranged to orient said antenna system as a whole in three dimensions; and means for determining, as said orientation is shifted, when instantaneous voltages of equal magnitude and time phase are delivered by the opposite ones of all of said electrically identical loops thereby to identify the orientation of said antenna system in which said axis of symmetry is normal to the plane tangent to the wave front.

9. An apparatus for determining the plane tangent to a radiant energy wave front, comprising an antenna system having an axis of symmetry and embodying a pair of electrically identical loops having their planes located in electrical symmetry on opposite sides of said axis and other than normal thereto, said loops being connected in voltage opposition to output terminals symmetrically located with respect to the pair, means for rotating said pair of loops about said axis, said antenna system being mounted on a support arranged to orient it as a whole in three dimensions, and means for determining, as said orientation is shifted, when a position of orientation is reached in which a minimum of signal is delivered at said output terminals in all rotative positions of said loops to identify the orientation of said antenna system in which said axis of symmetry is normal to the plane tangent to the wave front.

10. A system according to claim 9, in which said last named means comprises a receiver electrically coupled to said antenna system at said terminals in a manner providing for maintenance of the coupling during continuous rotation of said antenna system.

11. An apparatus for determining the plane tangent to a radiant energy wave front, comprising an antenna system adapted to be electrically rotated about its axis of symmetry and embodying pairs of electrically identical loops physically stationary with respect to said axis of symmetry and having their planes located in electrical symmetry on opposite sides of said axis and other than normal thereto, said pairs being displaced from one another about said axis by an angle of 180 degrees divided by the number of pairs and having the loops of each pair connected in voltage opposition to output terminals symmetrically located with respect to the pair; shielded commutator means comprising a set of field coils corresponding in number and relative displacement to the number and displacement of said pairs, and having its coils connected, respectively, across the output terminals of the respective pairs, and a pick-up coil rotatable in the field of said set of field coils so that the electrical equivalent of a physically rotated pair of loops is attained; said antenna system being mounted on a support movable to orient said antenna system as a whole in three dimensions; and means for determining, as said orientation is shifted, when a position is reached in which a minimum of signal is received by said pick-up coil in all positions thereof thereby to identify the orientation of said antenna system in which said axis of symmetry is normal to the plane tangent to the wave front.

12. An apparatus according to claim 7, in which said pairs of loops are mounted in a plane transverse to the longitudinal axis of an aircraft, and in which said aircraft constitutes the support for said antenna system.

JOSEPH Y. HOUGHTON.
EDWARD L. KILPATRICK.